(12) United States Patent
Bezemer et al.

(10) Patent No.: US 8,933,136 B2
(45) Date of Patent: Jan. 13, 2015

(54) HIGH-SPEED STOP IN FISCHER-TROPSCH PROCESS

(75) Inventors: Gerrit Leendert Bezemer, Amsterdam (NL); Carolus Matthias Anna Maria Mesters, Amsterdam (NL); Thomas Joris Remans, Amsterdam (NL); Johannes Theodorus Maria Smits, Amsterdam (NL)

(73) Assignee: Shell Oil Company, Houston, TX (US)

( * ) Notice: Subject to any disclaimer, the term of this patent is extended or adjusted under 35 U.S.C. 154(b) by 980 days.

(21) Appl. No.: 12/638,647

(22) Filed: Dec. 15, 2009

(65) Prior Publication Data
US 2010/0184875 A1    Jul. 22, 2010

(30) Foreign Application Priority Data

Dec. 16, 2008 (EP) .................................. 08171746

(51) Int. Cl.
| | | |
|---|---|---|
| *C07C 27/00* | (2006.01) | |
| *B01J 35/02* | (2006.01) | |
| *B01J 8/22* | (2006.01) | |
| *C10G 2/00* | (2006.01) | |
| *B01J 23/75* | (2006.01) | |
| *B01J 23/847* | (2006.01) | |
| *B01J 23/889* | (2006.01) | |

(52) U.S. Cl.
CPC *B01J 35/023* (2013.01); *B01J 8/22* (2013.01); *C10G 2/341* (2013.01); *B01J 23/75* (2013.01); *B01J 23/8472* (2013.01); *B01J 23/8892* (2013.01); *B01J 2208/00637* (2013.01)
USPC ...................................................... 518/712

(58) Field of Classification Search
None
See application file for complete search history.

(56) References Cited

U.S. PATENT DOCUMENTS

| | | | |
|---|---|---|---|
| 6,512,017 B1 * | 1/2003 | Steynberg et al. | 518/712 |
| 6,974,842 B1 | 12/2005 | Spena et al. | 518/700 |
| 2003/0087971 A1 | 5/2003 | Steynberg et al. | 518/728 |
| 2005/0027020 A1 * | 2/2005 | Steynberg | 518/718 |
| 2007/0093560 A1 | 4/2007 | Althapp et al. | 518/726 |
| 2008/0262112 A1 | 10/2008 | Marion et al. | 518/706 |
| 2010/0081726 A1 * | 4/2010 | Tonkovich et al. | 518/700 |

FOREIGN PATENT DOCUMENTS

| | | | |
|---|---|---|---|
| CA | 2564721 | 4/2007 | ............ C10G 2/00 |
| CN | 101235316 | 8/2008 | ............ C10G 5/00 |
| EP | 0231988 A1 | 8/1987 | |
| EP | 0466240 A1 | 1/1992 | |
| EP | 1820838 | 8/2007 | ............ C10G 2/00 |
| GB | 2223237 | 4/1990 | ............ C07C 1/04 |
| GB | 2223237 A * | 4/1990 | ............ C07C 1/04 |
| GB | 2246576 | 2/1992 | ............ C07C 1/04 |
| JP | 2003292972 | 10/2003 | ............ C10G 2/00 |
| WO | WO2005026292 | 3/2005 | ............ C10G 2/00 |
| WO | WO2005075065 | * 8/2005 | |
| WO | WO2007009955 | * 1/2007 | |
| WO | WO2007065902 | * 6/2007 | |

* cited by examiner

Primary Examiner — Rosalynd Keys

(57) ABSTRACT

The present invention pertains to a process for carrying out a high-speed stop in a Fischer-Tropsch process which comprises providing a feed to a fixed bed reactor comprising a Fischer-Tropsch catalyst, the reactor being at reaction temperature and pressure, and withdrawing an effluent from the reactor, wherein the high-speed stop is effected by blocking provision of feed to the reactor and simultaneously blocking the withdrawal of effluent from the reactor.

13 Claims, No Drawings

HIGH-SPEED STOP IN FISCHER-TROPSCH PROCESS

This application claims the benefit of European Application No. 08171746.4 filed Dec. 16, 2008 which is incorporated herein by reference.

BACKGROUND OF THE INVENTION

The present invention relates to a Fischer-Tropsch process, in particular to a process for carrying out a high-speed stop in a Fischer-Tropsch process carried out in a fixed bed reactor.

The Fischer-Tropsch process can be used for the conversion of hydrocarbonaceous feed stocks into normally liquid and/or solid hydrocarbons (0° C., 1 bar). The feed stock (e.g. natural gas, associated gas, coal-bed methane, residual oil fractions, biomass and/or coal) is converted in a first step into a mixture of hydrogen and carbon monoxide. This mixture is often referred to as synthesis gas or syngas. The synthesis gas is fed into a reactor where it is converted over a suitable catalyst at elevated temperature and pressure into paraffinic compounds ranging from methane to high molecular weight molecules comprising up to 200 carbon atoms, or, under particular circumstances, even more.

Numerous types of reactor systems have been developed for carrying out the Fischer-Tropsch reaction. For example, Fischer-Tropsch reactor systems include fixed bed reactors, especially multi-tubular fixed bed reactors, fluidised bed reactors, such as entrained fluidised bed reactors and fixed fluidised bed reactors, and slurry bed reactors such as three-phase slurry bubble columns and ebullated bed reactors.

The Fischer-Tropsch reaction is very exothermic and temperature sensitive. In consequence, careful temperature control is required to maintain optimum operation conditions and desired hydrocarbon product selectivity.

The fact that the reaction is very exothermic also has the consequence that when temperature control is not adequate, the reactor temperature can increase very quickly, which carries the risk of a reactor runaway, which may result in local deactivation of the catalyst.

The desired use of high-activity catalysts in Fischer-Tropsch fixed-bed reactors makes the situation even more challenging, because the susceptibility of a reactor to reactor runaway increases with increased catalyst activity. A reactor runaway is a most undesirable phenomenon, as it may result in catalyst deactivation which necessitates untimely replacement of the catalyst, causing reactor downtime and additional catalyst cost.

Therefore, there is need for a process for carrying out a high-speed stop in a Fischer-Tropsch reactor. A high-speed stop may, for example, be required when the temperature in the Fischer-Tropsch reactor increases to an unacceptable value either locally or over the entire reactor, when there is an interruption in the gas flow, or in the case of other unforeseen circumstances.

SUMMARY OF THE INVENTION

Accordingly, the present invention pertains to a process for carrying out a high-speed stop in a Fischer-Tropsch process which comprises providing a feed to a fixed bed reactor comprising a Fischer-Tropsch catalyst, the reactor being at reaction temperature and pressure, and withdrawing an effluent from the reactor, wherein the high-speed stop is effected by blocking provision of feed to the reactor and simultaneously blocking the withdrawal of effluent from the reactor. The feed provided to the fixed bed reactor comprises CO and $H_2$.

DETAILED DESCRIPTION OF THE INVENTION

Depending on the design of the reactor, the effluent can be a single gaseous phase, a multi-phase effluent or two or more effluent streams with one or more being mainly gaseous and one or more being mainly liquid phase. In this invention, all effluent streams are stopped. In the present specification the word effluent, when used in the context of blocking the effluent, encompasses all effluent streams.

In the present specification the word feed, when used in the context of blocking the feed, encompasses all feed streams. Depending on the design of the reactor, the feed can be a single gaseous feed stream or two or more gas feed streams, or a multi-phase feed or two or more feed streams with one or more being mainly gaseous and one or more being mainly liquid phase.

The feed stream provided to the reactor, or the combination of feed streams provided to the reactor, comprises at least CO and $H_2$. During the high-speed stop according to the present invention, all feed streams are stopped, and no new feed streams are fed to the reactor. Hence, during the high-speed stop no feed is provided to the reactor any more, not even a feed stream that does not comprise CO or $H_2$.

As the withdrawal of effluent from the reactor is blocked simultaneously with blocking the provision of feed to the reactor, the reactor is fully blocked-in. No feed is provided and no effluent is withdrawn.

For good order's sake it is noted that when the provision of feed to the reactor and withdrawal of effluent from the reactor are blocked, there may still be some flow to the catalyst due to the contraction of the gas being converted into liquid products by the catalyst.

The invention thus concerns a process for carrying out a high-speed stop in a Fischer-Tropsch process which comprises providing a feed to a fixed bed reactor comprising a Fischer-Tropsch catalyst, the reactor being at reaction temperature and pressure, and withdrawing an effluent from the reactor, whereby the feed comprises CO and $H_2$, wherein the high-speed stop is effected by blocking provision of any feed stream to the reactor and simultaneously blocking the withdrawal of any effluent stream from the reactor.

When the reactor has been blocked, the reactor is cooled. The end temperature of the cooling step depends on the desired further action. In general, the reactor will be cooled to a temperature between ambient and 200° C. Where the reactor is cooled with a view to immediate restarting of the reactor, it will generally be cooled to a temperature in the range of 100-190° C., in particular to a value of 160-180° C.

The cooling speed will depend on the size of the reactor and further circumstances. For example, it may be in the range of 10-100° C. per hour.

If so desired, the reactor may also be depressurized, before, during, or after cooling. If so desired, the reactor may be depressurized to a value of, say, below 15 bar, more specifically in the range of 1-10 bar, for example in the range of 2-8 bar.

Depending on the process configuration, the performance of a high-speed stop in a Fischer-Tropsch reactor is often accompanied by a rise in temperature, culminating in a process-side temperature peak. This is caused by a decrease in gas hourly space velocity which leads to an increased conversion, accompanied by increased heat formation, and simultaneously to a decrease in heat removal capacity.

It was found that a high-speed stop according to the invention results in an increase in peak temperature which is substantially lower than the increase in peak temperature which is obtained when a high-speed stop is carried out by blocking the flow of feed to the reactor and depressurising the reactor via the bottom. It was also found that the procedure according to the invention does not result in substantial catalyst deactivation.

The process according to the invention is suitable for fixed bed reactors. In a preferred embodiment the reactor is a reactor tube, which has a ratio between length and diameter of at least 5, in particular at least 50. As an upper limit a ratio of at most 1000 may be mentioned.

In one embodiment, the reactor tube is a tube in a multitubular reactor, which comprises a plurality of reactor tubes at least partially surrounded by a heat transfer medium.

The tubes in a multitubular reactor generally have a diameter in the range of 0.5-20 cm, more in particular in the range of 1 to 15 cm. They generally have a length in the range of 3 to 30 m. The number of tubes in a multitubular reactor is not critical to the present invention and may vary in wide ranges, for example in the range of 4 to 50,000, more in particular in the range of 100 to 40,000.

Multitubular reactors and their use in Fischer-Tropsch processes are known in the art and require no further elucidation here.

In one embodiment, the catalyst is a particulate catalyst, that is, a catalyst in the form of particles. The shape of the catalyst may be regular or irregular. The dimensions are suitably 0.1-30 mm in all three directions, preferably 0.1-20 mm in all three directions, more in particular 0.1-6 mm. Suitable shapes are spheres and, in particular, extrudates. The extrudates suitably have a length between 0.5 and 30 mm, preferably between 1 and 6 mm. The extrudates may be cylindrical, polylobal, or have any other shape. Their effective diameter, that is, the diameter of a sphere with the same outer surface over inner volume ratio, is suitably in the range of 0.1 to 10 mm, more in particular in the range of 0.2-6 mm.

A fairly recent trend in the development of Fischer-Tropsch catalysts is the development of catalyst particles with a decreased diffusion limitation. It has been found that catalysts with a decreased diffusion limitation are highly active in Fischer-Tropsch processes. However, due to their high activity, and their higher activation energy, their use entails an increased risk of reactor runaway. Further, it has also been found that catalysts with a decreased diffusion limitation are particularly sensitive to how a high-speed stop is carried out. More in particular, it has been found that for a catalyst with a decreased diffusion limitation a high-speed stop performed by blocking the flow of feed to the reactor and depressurising the reactor via the bottom may lead to the formation of a temperature peak of the order of 100° C., which is difficult to address in commercial operation. On the other hand, when for the same decreased diffusion limitation catalyst the high-speed stop according to the invention was carried out, this resulted in an increase in peak temperature of the order of 23° C. Therefore, the process according to the invention is of particular interest for reactors comprising a catalyst with decreased diffusion limitation, in particular with an effective diameter of at most 2 mm, more in particular of at most 1.6 mm, still more in particular of at most 1.5 mm. Catalysts with a decreased diffusion limitation are for example described in WO2003/013725, WO2008/087149, WO2003/103833, and WO2004/041430.

The Fischer-Tropsch reaction is preferably carried out at a temperature in the range from 125 to 400° C., more preferably 175 to 300° C., most preferably 200 to 260° C. The pressure preferably ranges from 5 to 150 bar, more preferably from 20 to 80 bar. The gaseous hourly space velocity may vary within wide ranges and is typically in the range from 500 to 10000 Nl/l/h, preferably in the range from 1500 to 4000 Nl/l/h. The hydrogen to CO ratio of the feed as it is fed to the catalyst bed generally is in the range of 0.5:1 to 2:1.

Products of the Fischer-Tropsch synthesis may range from methane to heavy hydrocarbons. Preferably, the production of methane is minimized and a substantial portion of the hydrocarbons produced have a carbon chain length of a least 5 carbon atoms. Preferably, the amount of C5+ hydrocarbons is at least 60% by weight of the total product, more preferably, at least 70% by weight, even more preferably, at least 80% by weight, most preferably at least 85% by weight. The CO conversion of the overall process is preferably at least 50%.

The products obtained via the process according to the invention can be processed through hydrocarbon conversion and separation processes known in the art to obtain specific hydrocarbon fractions. Suitable processes are for instance hydrocracking, hydroisomerisation, hydrogenation and catalytic dewaxing. Specific hydrocarbon fractions are for instance LPG, naphtha, detergent feedstock, solvents, drilling fluids, kerosene, gasoil, base oil and waxes.

Fisher-Tropsch catalysts are known in the art. They typically comprise a Group VIII metal component, preferably cobalt, iron and/or ruthenium, more preferably cobalt. Typically, the catalysts comprise a catalyst carrier. The catalyst carrier is preferably porous, such as a porous inorganic refractory oxide, more preferably alumina, silica, titania, zirconia or combinations thereof. References to the Periodic Table and groups thereof used herein refer to the previous IUPAC version of the Periodic Table of Elements such as that described in the 68th Edition of the Handbook of Chemistry and Physics (CPC Press).

The optimum amount of catalytically active metal present on the carrier depends inter alia on the specific catalytically active metal. Typically, the amount of cobalt present in the catalyst may range from 1 to 100 parts by weight per 100 parts by weight of carrier material, preferably from 10 to 50 parts by weight per 100 parts by weight of carrier material.

The catalytically active metal may be present in the catalyst together with one or more metal promoters or co-catalysts. The promoters may be present as metals or as the metal oxide, depending upon the particular promoter concerned. Suitable promoters include oxides of metals from Groups IA, IB, IVB, VB, VIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, manganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

A most suitable catalyst comprises cobalt as the catalytically active metal and zirconium as a promoter. Another most suitable catalyst comprises cobalt as the catalytically active metal and manganese and/or vanadium as a promoter. The promoter, if present in the catalyst, is typically present in an amount of from 0.1 to 60 parts by weight per 100 parts by weight of carrier material. It will however be appreciated that the optimum amount of promoter may vary for the respective elements which act as promoter. If the catalyst comprises cobalt as the catalytically active metal and manganese and/or vanadium as promoter, the cobalt:(manganese+vanadium) atomic ratio is advantageously at least 12:1.

It will be understood that it is within the scope of the skilled person to determine and select the most appropriate conditions for a specific reactor configuration and reaction regime.

The present invention is illustrated by the following example, without being limited thereto or thereby.

Example 1

Comparative Example

A Fischer-Tropsch process was operated at a temperature of about 210° C. and a pressure of about 40 bar in a fixed-bed reactor containing a catalyst.

A high-speed stop was carried out by blocking the flow of feed to the reactor, while maintaining a nitrogen feed at an LHSV of 50 Nl/l/h. The reactor was depressurized via the bottom to a pressure of 20 barg in 6 minutes, and then to a pressure of 6 barg in an additional 14 minutes.

The reactor temperature was measured during the high-speed stop, and a peak temperature of +100° C. above the maximum reaction temperature prior to the high-speed stop was measured.

Upon restart of the reactor it was found that no catalyst deactivation has taken place.

Example 2

Comparative Example

A Fischer-Tropsch process was operated at a temperature of about 222° C. and a pressure of about 60 bar in a fixed-bed reactor containing a catalyst.

A high-speed stop was carried out by blocking the flow of feed to the reactor. The reactor was depressurized via the bottom to a pressure of 20 barg in 6 minutes, and then to a pressure of 6 barg in an additional 14 minutes.

The reactor temperature was measured during the high-speed stop, and a peak temperature of more than 300° C. above the maximum reaction temperature prior to the high-speed stop was measured. Higher temperatures did occur during this runaway, but could not be measured.

Upon restart of the reactor it was found that the reactor was blocked due to excessive cokes formation.

Example 3

Example According to the Invention

A Fischer-Tropsch process was operated at a temperature of about 210° C. and a pressure of about 40 bar in a fixed-bed reactor containing a catalyst.

A high-speed stop was carried out by blocking the flow of feed to the reactor and the flow of effluent from the reactor. The reactor was cooled at 20° C./h to 160° C. It was then depressurized via the bottom to a pressure of 20 barg in 6 minutes, and then to a pressure of 6 barg in an additional 14 minutes.

The reactor temperature was measured during the high-speed stop, and a peak temperature of +23° C. above the maximum reaction temperature prior to the high-speed stop was measured.

Upon restart of the reactor it was found that no catalyst deactivation had taken place.

As compared to the procedure in the comparative Example 1 above, it appeared that the procedure according to the invention resulted in a substantially lower peak temperature.

Example 4

Example According to the Invention

A Fischer-Tropsch process was operated at a temperature of about 222° C. and a pressure of about 60 bar in a fixed-bed reactor containing a catalyst.

A high-speed stop was carried out by blocking the flow of feed to the reactor and the flow of effluent from the reactor. The reactor was cooled at 20° C./h to 160° C. It was then depressurized via the bottom to a pressure of 20 barg in 6 minutes, and then to a pressure of 6 barg in an additional 14 minutes.

The reactor temperature was measured during the high-speed stop, and a peak temperature of +25° C. above the maximum reaction temperature prior to the high-speed stop was measured.

Upon restart of the reactor it was found that no catalyst deactivation had taken place.

As compared to the procedure in the comparative Example 2 above, it appeared that the procedure according to the invention resulted in a substantially lower peak temperature. Some experimental data are summarised in Table 1.

TABLE 1

| | FT temp | FT pressure | Feed & effluent conditions during high-speed stop | Peak temp high-speed stop above max reaction temp |
|---|---|---|---|---|
| Example 1; comp | 210° C. | 40 bar | $N_2$ feed; depressurised via the bottom | +100° C. |
| Example 2; comp | 222° C. | 60 bar | blocked feed; depressurised via the bottom | >300° C. above |
| Example 3; invention | 210° C. | 40 bar | blocked feed; blocked effluent | +23° C. |
| Example 4; invention | 222° C. | 60 bar | blocked feed; blocked effluent | +25° C. |

What is claimed is:

1. A process for carrying out a high-speed stop in a Fischer-Tropsch process in a reactor, comprising the step of simultaneously blocking provision of feed to and withdrawal of effluent from the reactor, wherein the Fischer-Tropsch process comprises providing a feed to a multi-tubular, fixed bed reactor having tubes with a diameter between 1-15 cm and a length in the range of 3-30 meters, the tubes being at least partially surrounded by a heat transfer medium, the fixed bed comprising a Fischer-Tropsch catalyst, the reactor being at reaction temperature and pressure, and withdrawing an effluent from the reactor.

2. A process according to claim 1, wherein the feed provided to the fixed bed reactor comprises CO and $H_2$.

3. A process according to claim 1, wherein the reactor is depressurised before, during, or after cooling.

4. A process according to claim 1, wherein the catalyst is a particulate catalyst with an effective diameter of at most 1.6 mm.

5. A process for carrying out a high-speed stop in a Fischer-Tropsch process in a reactor, comprising the step of simultaneously blocking provision of feed to and withdrawal of effluent from the reactor, wherein the Fischer-Tropsch process comprises providing a feed to a multi-tubular, fixed bed reactor having tubes with a diameter between 1-15 cm and a length in the range of 3-30 meters, the tubes being at least partially surrounded by a heat transfer medium, the fixed bed comprising a Fischer-Tropsch catalyst, the reactor being at reaction temperature and pressure, and withdrawing an effluent from the reactor, wherein the high-speed stop is followed by cooling of the reactor.

6. A process according to claim 5, wherein the feed provided to the fixed bed reactor comprises CO and $H_2$.

7. A process according to claim 5, wherein the reactor is depressurised before, during, or after cooling.

8. A process according to claim 5, wherein the reactor tubes have a ratio between length and diameter of at least 50:1.

9. A process for carrying out a high-speed stop in a Fischer-Tropsch process in a reactor, comprising the step of simultaneously blocking provision of feed to and withdrawal of effluent from the reactor, wherein the Fischer-Tropsch process comprises providing a feed to a multi-tubular, fixed bed reactor having tubes with a diameter between 1-15 cm and a length in the range of 3-30 meters, the tubes being at least partially surrounded by a heat transfer medium, the fixed bed comprising a Fischer-Tropsch catalyst, the reactor being at reaction temperature and pressure, and withdrawing an effluent from the reactor, wherein the reactor tubes have a ratio between length and diameter of at least 50:1.

10. A process according to claim 9, wherein the feed provided to the fixed bed reactor comprises CO and $H_2$.

11. A process according to claim 9, wherein the high-speed stop is followed by cooling of the reactor.

12. A process according to claim 11, wherein the reactor is depressurised before, during, or after cooling.

13. A process according to claim 9, wherein the catalyst is a particulate catalyst with an effective diameter of at most 1.6 mm.

* * * * *